United States Patent [19]

Grunau et al.

[11] Patent Number: 5,275,655
[45] Date of Patent: Jan. 4, 1994

[54] CEMENTITIOUS COMPOSITION WITH NONADHERENT SURFACE

[75] Inventors: Klaus F. Grunau, Hendersonville; William W. Hamilton, Blowing Rock, both of N.C.

[73] Assignee: Cer-Con, Inc., Blowing Rock, N.C.

[21] Appl. No.: 977,577

[22] Filed: Nov. 17, 1992

[51] Int. Cl.$^5$ .............................. C04B 7/32
[52] U.S. Cl. .................... 106/696; 106/38.2; 106/38.35
[58] Field of Search ............ 106/692, 696, 695, 38.2, 106/38.22, 38.27, 38.3, 38.35

[56] References Cited

U.S. PATENT DOCUMENTS

| | | | |
|---|---|---|---|
| 3,663,252 | 5/1972 | Stiglitz et al. | 106/104 |
| 3,991,005 | 11/1976 | Wallace | 260/38 |
| 3,995,086 | 11/1976 | Plunguian et al. | 428/310 |
| 4,033,782 | 7/1977 | Ray et al. | 106/204 |
| 4,036,839 | 7/1977 | Plunguian et al. | 264/256 |
| 4,088,808 | 5/1978 | Cornwell et al. | 428/409 |
| 4,126,475 | 11/1978 | Hansen et al. | 106/118 |
| 4,132,558 | 1/1979 | Uchikawa et al. | 106/104 |
| 4,222,784 | 9/1980 | Caspar et al. | 106/93 |
| 4,229,225 | 10/1980 | Kraszewski et al. | 106/99 |
| 4,230,502 | 10/1980 | Lustig et al. | 106/314 |
| 4,357,166 | 11/1982 | Babcock | 106/89 |
| 4,981,740 | 1/1991 | Larsen | 429/34.4 |

Primary Examiner—Karl Group
Assistant Examiner—Paul Marcantoni
Attorney, Agent, or Firm—Bell, Seltzer, Park & Gibson

[57] ABSTRACT

These and other objects are satisfied by the present invention, which as a first aspect provides a cementitious composition with non-stick properties. The composition comprises a calcium aluminate cement matrix, a mineral filler, a polymer binding agent, and a fluoropolymer. The composition may optionally include other components which enhance certain mechanical, chemical, or processing characteristics of the composition, such as hardeners, defoamers, lubricants, accelerators, reaction inhibitors, suspension agents, and heat transfer enhancers.

24 Claims, No Drawings

CEMENTITIOUS COMPOSITION WITH NONADHERENT SURFACE

FIELD OF THE INVENTION

This invention relates generally to cementitious compositions, and more specifically relates to calcium aluminate compositions which produce articles with nonadherent surfaces.

BACKGROUND OF THE INVENTION

There are numerous articles of manufacture which advantageously have one or more surfaces which are so-called "non-stick" surfaces, which refers to the ability of such surfaces to resist adhesion of foreign matter. By resisting adhesion, the surface easily releases foreign matter in contact with the non-stick surface. One area in which devices that include a non-stick surface are used frequently is food preparation; the ability of a surface which contacts food during cooking to resist adhesion of the food significantly eases clean-up. Another common application for non-stick surface is in molds for forming an object of a particular configuration. If the mold includes non-stick surfaces, the removal of the molded object is easier, faster, and less likely to damage the article.

To date, articles which require one or more non-stick surfaces in operation generally are produced in one of two forms. The first comprises an article which is formed entirely of non-stick material. Generally such materials are fluoropolymers, such as those sold under the tradenames Teflons ® and Hostaflons ®. Articles so formed have non-stick properties throughout their entire mass, so any scraping or abuse of the surfaces of the article does not significantly reduce the release properties of those surfaces. However, because non-stick materials generally have selectively low mechanical strength, hardness and temperature resistance, the use of these materials is restricted to applications exposed to selectively low mechanical stress and temperature levels.

The second common non-stick form comprises an underlying substrate, such as metal, coated with a non-stick material. Generally the non-stick coating is a polymeric material, such as those described above, or a metal-based coating, such as those sold under the trademark Silverstone ®. Coated articles potentially can withstand higher mechanical stress and temperature than articles integrally formed entirely of non-stick polymers, but are often plagued by chipping, peeling, and leaching of the coating from the article. This is particularly problematic in food preparation, as chipping or peeling of the non-stick coating not only reduces the non-stick properties of the article, but can also cause contamination of the food.

One material type which has received little attention in non-stick application is cement. Cementitious compositions are used to form a wide variety of products, including construction supports, sidewalks, building and decorative tiles, and the like. Generally these compositions comprise a base material, such as Portland cement or calcium aluminate, an inorganic filler, and other additives which influence the physical properties of the composition. Cementitious compositions are attractive to manufacturers and consumers because of their strength, hardness, heat resistance, ease of forming into a desired shape, and relatively low cost.

One limitation of cementitious compositions has been the relatively high surface adhesion of such compositions. This property has limited their use in non-stick applications. One solution offered to improve surface release is to coat a cementitious article with a fluoropolymer coating, see, e.g., U.S. Pat. No. 4,126,475 to Hansen et al., much as is done for other underlying substrates. However, coated cementitious articles are prone to chipping and peeling in the same manner as other coated materials. The prior art fails to disclose a cementitious composition which includes a component mixed throughout the composition which imparts non-stick properties to the material.

It is therefore a first object of the invention to provide a non-stick cementitious composition which can be formed into articles having non-stick surfaces.

It is an additional object of the present invention to provide articles formed from such a cementitious composition.

SUMMARY OF THE INVENTION

These and other objects are satisfied by the present invention, which as a first aspect provides a cementitious composition with non-stick properties. The composition comprises a calcium aluminate cement matrix, a mineral filler, a polymer binding agent, and a fluoropolymer. The composition may optionally include other components which enhance certain mechanical, chemical, or processing characteristics of the composition, such as hardeners, defoamers, lubricants, accelerators, reaction inhibitors, suspension agents, and heat transfer enhancers and the like.

A second aspect of the present invention is an article formed from the above-described cementitious composition which includes at least one non-stick surface. Preferred articles include molds, particularly prototype molds, and parts which provide a cooking surface for food preparation devices.

DETAILED DESCRIPTION OF THE INVENTION

The present invention will now be described more fully hereinafter. This invention may be embodied in many forms and should not be construed as limited to the embodiment set forth herein; instead, this embodiment is provided so that this disclosure will be thorough and complete, and will fully convey the scope of the invention to those skilled in the art. In the description that follows, on occasion the percentage of the total composition that individual components comprise will be set forth. Reference to the percentage of the total composition that a component comprises is understood to be the weight percent of the component unless otherwise indicated.

The calcium aluminate matrix can be virtually any calcium aluminate hydraulic cement product. As used herein, the term "hydraulic cement" refers to a composition of inorganic particles which when mixed with water react to form a hard, rock-like mass, and the term "calcium aluminate" refers to a hydraulic cement composition of CaO (calcium oxide) and $Al_2O_3$ (alumina). The calcium aluminate matrix can comprise between about 25 and 45 percent of the composition by weight, and preferably comprises between about 27 and 35 percent of the composition. A calcium aluminate product containing approximately 65 to 75 percent alumina and 35 to 25 percent calcium oxide is preferred, as is a product which comprises particles of a size so that a specific surface area of the matrix of between about 3,900 and 4,500 cm$^2$/g. A particularly preferred calcium aluminate composition is Secar 71, available from LaFarge Calcium Aluminates, Chesapeake, Va.

Suitable inorganic fillers include any fillers known to those skilled in the art to be compatible with the chosen calcium aluminate base. The filler particles can be of any suitable shape, including granules, fibers, acicular crystals, and powders with acicular crystals having an aspect ratio of between 3:1 and 25:1 being preferred. Preferably, inorganic fillers comprise between about 25 and 45 percent of the composition.

Exemplary fillers include calcium metasilicate, aluminum oxide, silicon carbide, amorphous silica, and combinations thereof. Calcium metasilicates used with the present invention will preferably contain between about 45 to 55 percent calcium oxide and between about 55 to 45 percent silicon dioxide. Exemplary calcium metasilicates are Vansil W-10, available from R. T. Vanderbilt Company, Inc., Norwalk, Conn., Nyad-G, available from Nyco Minerals, Inc., Willsboro, N.Y., and Nyad 325, also available from Nyco Minerals, Inc., with Nyad-G being preferred. A preferred silicon carbide is Electrocarb, available from Electro Abrasives Corporation, Buffalo, N.Y. A preferred amorphous silica is condensed silica fume, available from SKW Canada Inc., Becancour, Quebec, Canada. A preferred aluminum dioxide is FRF-10, available from Alcan Chemicals, Cleveland, Ohio.

The inorganic filler generally affects the physical properties of the composition and should be chosen accordingly. For example, a calcium metasilicate or aluminum oxide filler can enhance the mechanical elasticity of the composition, while a mixture of calcium metasilicate and silicon carbide can provide increased mechanical strength, surface hardness and surface toughness at elevated temperatures.

The fluoropolymer is included in the composition to provide therein release properties to external surfaces of articles formed therefrom. In contrast to other non-stick cementitious compositions, which include non-stick coating over a conventional cement interior, the fluoropolymer is dispersed substantially homogeneously throughout the composition. As such, the surface release properties of compositions of the present invention are retained if the surface is marred by chipping and the like. In the compositions of the present invention, any fluoropolymer which is mechanically and chemically compatible with the other components of the composition, will disperse substantially homogeneously throughout the composition, and will withstand the mechanical, chemical, and processing conditions to which it is subjected is suitable. The fluoropolymer can comprise between 5 and 15 percent of the composition, and preferably will comprise between about 6 and 12 percent of the composition.

Exemplary fluoropolymers include polytetrafluoroethylene (PTFE), polymers formed of fluoroethylene propylene (FEP), perfluorovinyl ether polymers, and copolymers of these and other monomers, such as perfluoroalkoxy (PFA), a copolymer of tetrafluoroethylene and perfluorovinyl ether. The fluoropolymer can be provided in the composition as a solid powder, pellet, resin, particulate, and the like, or can be provided in an aqueous solution, suspension, or dispersion. A preferred fluoropolymer is PTFE; more preferably, the PTFE is provided in an aqueous solution in which the PTFE comprises between about 50 and 70 percent by weight of the solution. An exemplary PTFE solution is Teflon ® T-30 (available from DuPont Polymer Products, Wilmington, Del.). Teflon ® T-30 is a dispersion containing about 60 percent PTFE, about 30 percent water, and about 10 percent organic surfactant.

One or more polymer binding agents are included in the composition to promote adhesion of the calcium aluminate and the inorganic filler particles. The binding agent can be any polymer binding agent that is chemically compatible with the calcium aluminate powder. The binding agent can comprise either a particulate polymer dissolved or suspended in an appropriate solvent or a polymeric solid in powder, particulate, pellet, resin, or some other form. If the binding agent is in emulsion form, an aqueous emulsion of particulate polymer in a solvent having a solids content of between 45 and 55 percent is preferred. The polymer binding agent can comprise between about 10 and 20 percent of the composition.

Exemplary binding agents include polyvinyl acetate, polyvinyl alcohol, polymethane, polyethylene, polyacrylamide, polyethylene oxide and copolymers and combinations thereof. Preferred polymer binding agents include polyethylene, polyvinyl acetate, and combinations thereof. Polyethylenes, particularly high molecular weight polyethylenes, have the added advantage of inhibiting shrinkage of the composition during curing, which reduces microcracking of the surface of an article formed from the composition. A preferred high molecular weight polyethylene is Hostalen GUR, which is available from Höechst Celanese Corporation, Somerville, N.J. in a solid form. Preferred polymer binder emulsions are: Liquid Bond, a proprietary formulation available from R-Co Products, Inc., Lakewood, N.Y.; ACI C-325 and ACI 1339, proprietary vinyl acetate-based formulations available from Adhesive Compounder's Inc., Des Moines, Iowa; and Gascorez FF, a proprietary neutralized carboxylic polymer emulsion available from Gaston Chemicals, Inc., Gastonia, N.C. One preferred embodiment of the composition includes a 1:1 to 1:3 combination of high molecular weight polyethylene and vinyl acetate emulsion.

The compositions of the present invention can optionally include a number of additional components which enhance the processing or performance characteristics of the composition. These can include inorganic fillers, hardeners, reaction accelerators or inhibitors, defoamers, lubricants, surface enhancers, heat transfer agents, suspension agents, and other agents that can desirably influence the performance of the composition.

Hardeners are included in the composition to increase the surface hardness of articles formed therefrom. Increased hardness can reduce the tendency of an article formed from the composition to chip, which in turn can increase the lifetime of the article. The degree of hardness improvement will depend on a number of factors, including the chemical structure of the hardener, its particle size, and the percentage of hardener in the composition. Exemplary hardeners include silicates, such as silicon dioxide, which can be provided either in solution or as a solid. Preferred silicates include Nyacol 830, Nyacol 9950, Nyacol 3420, and Nyacol 2040, each of which are aqueous silicon dioxide solutions available from The PQ Corporation, Valley Forge, Pa. These hardeners can be included in the composition in percentages ranging from between about 2 to 25 percent. A preferred silicon dioxide is Nyacol 2040, which more preferably comprises between about 7 and 17 percent of the composition.

The reaction accelerator can be any compound which will initiate the binding of the calcium aluminate particles and the inorganic filler to the latex binding agent while present in a solution having a pH value of between 6.5 and 8.0. The recited pH range is that produced by calcium aluminate-based compositions, which tend to be less alkaline than other hydraulic cements. The accelerator preferably comprises between about 0.5 and 5 percent, and more preferably comprises between about 0.5 and 1 percent of the composition. Exemplary accelerators are lithium hydroxide and lithium carbonate, with lithium carbonate being preferred. A preferred lithium hydroxide is monohydrate lithium hydroxide, available from FMC Corporation, Gastonia, N.C. A preferred lithium carbonate is available from Gaston Chemicals, Inc., Gastonia, N.C.

The composition can also include a defoaming agent, the presence of which will reduce the tendency of the composition to trap air and thereby foam during processing. Reduced foaming leads to a composition, and thus a formed article, that is less permeable to water, which can be important in high-temperature applications, as the presence of water due to humid atmospheric conditions in the composition can cause decomposition of the cementitious matrix. Preferably, the defoamer comprises between about 0.1 and 1 percent of the composition. An exemplary defoamer is polyethylene glycol, which has the additional advantage of improving the lubricity of the composition. A preferred polyethylene glycol has a specific gravity of between about 1.00 and 1.10. A more preferred polyethylene glycol is Polyglycol P-1200, which is available from The Dow Chemical Company, Midland, Mich.

Surface enhancers can be included in the composition to improve the hardness, gloss, and releasability of surface of an article formed from the composition. Generally, the surface can be enhanced by mineral particulate compounds that are compatible with the other components of the composition. The surface is best enhanced when the particulate matter is in a fine powder or dust form which preferably is a 150–200 mesh-sized particulate. Exemplary compounds include calcium carbonate-containing compositions, such as marble. A preferred marble dust is a proprietary marble dust formulation available from R-Co, Inc., Lakewood, N.Y. A surface enhancer can be included in the composition in a percentage ranging from about 2 to 20 percent; more preferably a surface enhancer is included in the compositions in a percentage between 7 and 13 percent.

Optionally, the composition can include a heat transfer agent which aids in the conveyance of heat to the surface of an article formed from the composition. Such an agent is particularly advantageous in articles used in the cooking of food, as the steady transfer of heat from the cementitious article to the food can be vital to successful preparation. Exemplary heat transfer agents include copper, brass, steel, and other conductive metals. The heat transfer agent can be in a number of forms, including powder, particulate, fiber, or combinations thereof.

Under some processing conditions, it may be desirable to slow the reaction of the cement. For example, if a defoamer is used, a slower cement reaction provides additional time for the defoamer to act before the cement sets. Preferably, such a reaction inhibitor comprises between about 0.1 and 3 percent of the composition. An exemplary reaction inhibitor is monoaluminum phosphate solution.

Further, certain components, and in particular initiators, may be relatively difficult to dissolve. In this event, the composition may require a suspension agent to aid in the solvation of the insoluble component. Suspension agents may be included in the composition at a concentration of between about 0.1 and 3 percent. An exemplary suspension agent for initiator solution is Mason's 8, a proprietary formulation available from Speeco Industries, Inc., Lemont, Ill.

Also optional to the composition are reinforcing fillers used to strengthen the composition. Suitable reinforcing agents include any that are chemically compatible with the composition and that do not adversely affect the surface hardness or gloss of the composition. Exemplary reinforcing fillers include fiberglass, aluminum, and Kevlare® fibers.

The process for making the composition comprises first dissolving any initiator, defoamer, suspension agent, and hardener to be included in the composition in water for approximately 20 minutes. The fluoropolymer and any polymer binder emulsion to be included in the composition is then mixed into the solution and blended for approximately 20 minutes into a slurry. The calcium aluminate matrix, inorganic fillers, and any solid hardeners, surface enhancers, or polymer powders are then added. This mixture is combined with any desired reinforcing agent, such as a glass or metal fiber, for formation into a desired shape. The pot life of this mixture is between about 15 and 40 minutes, which is generally sufficient time to create whatever configuration is desired.

The composition can be formed into an article by spraying or pouring into a mold of the desired shape. The composition will cure to green strength at room temperature within 1 to 2 hours, and will cure to full strength 12 to 36 hours. As is known in the art, the curing time can be decreased by heating the molded article to between about 200° and 400° F. With some embodiments, elevated temperature curing will also improve the binding of the polymer binding agent and increase the surface hardness of the composition. Exemplary articles that can be formed from the composition include food preparation equipment, such as grill or griddle surfaces, and molds for forming other articles. In particular, prototype molds are advantageous for use with the present composition, as they can be formed quickly and inexpensively in comparison to epoxy or steel molds.

Further, the composition is sufficiently inviscid that it can be brushed onto a surface and allowed to dry to form a non-stick surface. This capability allows the composition to be used in a variety of applications wherein the strength, hardness, and non-stick properties of the composition are desirable, but for other reasons (for example, weight reduction), it is not desirable to form the entire article from the composition.

The present invention and its advantages over the prior art will be more fully understood and appreciated from the illustrative examples that follow. It is to be understood that the examples are for the purpose of illustration and are not intended to be limiting upon the scope of the invention. A person skilled in the applicable arts will appreciate from this example that the invention can be embodied in many different forms other than those specifically disclosed. In these examples, the relative amount of each component is set forth in "parts,"

which as used herein refers to the relative weight percent of the component compared to the other components of the formulation.

EXAMPLE 1

Solid Component Mixture

The composition can be mixed by first combining the calcium aluminate base and fillers into a mixture of solid components, blending the remaining ingredients in a separate drum into a liquid slurry, then combining these two mixtures into a single composition. The ingredients of the solid component mixture are combined in the amounts shown in Table 1.

| Component | Brand Name | Parts |
| --- | --- | --- |
| Calcium Aluminate | Secar 71 | 50 |
| Calcium Metasilicate | Nyad G | 25 |
| Marble Dust | R-Co | 10 |
| Polyurethane | Hostalen GUR | 15 |

EXAMPLES 2-5

Formulation 1

Each of the following liquid solutions was prepared by first combining the silicon dioxide hardener emulsion with water, then adding the remaining ingredients to form a liquid slurry.

| Component | Brand Name | Parts |
| --- | --- | --- |
| Silicon Dioxide | Nyacol 2040 | 25 |
| Fluoropolymer | T-30 | 25 |
| Polymer Binder | ACI 325 | 25 |
| $H_2O$ | — | 10 |
| Lithium Carbonate | — | 2 |
| Polyethylene Glycol | P-1200 | 1 |
| Suspension Agent | Mason's 8 | 1 |
| Formulation 2 | | |
| Silicon Dioxide | Nyacol 2040 | 25 |
| Fluoropolymer | T-30 | 25 |
| Polymer Binder | ACI 1339 | 25 |
| $H_2O$ | — | 10 |
| Lithium Carbonate | — | 2 |
| Polyethylene Glycol | P-1200 | 1 |
| Suspension Agent | Mason's 8 | 1 |
| Formulation 3 | | |
| Silicon Dioxide | Nyacol 2040 | 40 |
| Fluoropolymer | T-30 | 19 |
| Polymer Binder | ACI 1339 | 19 |
| Polymer Binder | Liquid Bond | 19 |
| $H_2O$ | — | 5 |
| Lithium Carbonate | — | 2 |
| Polyethylene Glycol | P-1200 | 1 |
| Suspension Agent | Mason's 8 | 1 |
| Formulation 4 | | |
| Silicon Dioxide | Nyacol 2040 | 23 |
| Fluoropolymer | T-30 | 27 |
| Polymer Binder | GFF | 20 |
| Polymer Binder | ACI 1339 | 20 |
| $H_2O$ | — | 6 |
| Lithium Carbonate | — | 2 |
| Polyethylene Glycol | P-1200 | 1 |
| Suspension Agent | Mason's 8 | 1 |

In each instance these liquid formulations were blended as described above, then combined with the solid mixture of Example 1 in a 60:100 parts ratio. The formulations were molded into a cup-like configuration. The non-stick properties of each composition was assessed by the tendency for the molded cup to leave a residue upon ejection from the mold. None of these formulations showed any residue, and thus demonstrate excellent non-stick properties. All were also found to have acceptable mechanical, chemical, and processing properties.

The foregoing examples are illustrative of the present invention, and are not to be construed as limiting thereof. The invention is defined by the following claims, with equivalents of the claims to be included therein.

What is claimed is:

1. A non-stick cementitious composition comprising:
  (a) a calcium aluminate cement matrix comprising between about 25 and 45 percent of the composition by weight;
  (b) a polymer binding agent comprising between 10 to 20 percent of the composition by weight;
  (c) a fluoropolymer comprising between 5 to 15 percent of the composition by weight; and
  (d) a mineral filler comprising between 25 to 45 percent of the composition by weight;

2. A cementitious composition according to claim 1 further comprising at least one hardener comprising between 2 to 25 percent of the composition by weight.

3. A cementitious composition according to claim 2, wherein said at least one hardener comprises a hardener selected from the group consisting of silica and zirconia.

4. A cementitious composition according to claim 1 further comprising a reaction accelerator comprising between 0.5 and 5 percent of the composition by weight.

5. A cementitious composition according to claim 1, wherein said accelerator is selected from the group consisting of lithium carbonate and lithium hydroxide.

6. A cementitious composition according to claim 1 further comprising a defoaming agent comprising between 0.1 and 1 percent of the composition by weight.

7. A cementitious composition according to claim 6, wherein said defoaming agent comprises polyethylene glycol.

8. A cementitious composition according to claim 1 further comprising a heat transfer enhancer.

9. A cementitious composition according to claim 8, wherein said heat transfer enhancer is selected from the group consisting of copper and brass.

10. A cementitious composition according to claim 4 further comprising a suspension agent, comprising between 0.1 and 3 percent of the composition by weight, to facilitate suspension of said reaction accelerator.

11. A cementitious composition according to claim 1, wherein said mineral filler is calcium metasilicate.

12. A cementitious composition according to claim 1, wherein said calcium aluminate matrix comprises between about 60 and 80 percent aluminum oxide by weight.

13. A cementitious composition according to claim 1, wherein said calcium aluminate cement matrix comprises a powder having a specific surface area of between about 3,900 and 4,000 $cm^2/g$.

14. A cementitious composition according to claim 1, wherein said polymer binding agent is selected from the group consisting of polyethylene, polyvinyl acetate, and combinations thereof.

15. A cementitious composition according to claim 1 wherein said polymer binding agent comprises an aqueous polymer emulsion.

16. A cementitious composition according to claim 1, wherein said fluoropolymer is selected from the group consisting of: polytetrafluoroethylene, fluoroethylene propylene polymer, perfluorovinyl ether polymer, tetrafluoroethylene/perfluorovinyl ether copolymer, and copolymers thereof.

17. A cementitious composition according to claim 1, wherein said fluoropolymer comprises an aqueous solution of polytetrafluoroethylene.

18. A cementitious composition according to claim 1 further comprising a reaction inhibitor comprising between 0.1 and 3 percent of the composition by weight.

19. A cementitious composition according to claim 18, wherein said reaction inhibitor comprises monoaluminum phosphate.

20. An article of manufacture formed of a composition of claim 1.

21. An article of manufacture according to claim 20, wherein said article is a mold.

22. (A) An article having thereon a coating comprising a composition of claim 1.

23. A cementitious composition according to claim 1 further comprising a surface enhancer comprising between 2 and 20 percent of the composition by weight.

24. A cementitious composition according to claim 23, wherein said surface enhancer comprises calcium carbonate.

* * * * *